(No Model.)

J. H. BAKER, G. F. SHEVLIN & F. H. BAKER.
ECCENTRIC.

No. 543,667. Patented July 30, 1895.

Witnesses
Chas H Smith
J. Staib

Inventors
James H. Baker
George F. Shevlin
Frederick H. Baker
per Lemuel W. Serrell
Atty.

UNITED STATES PATENT OFFICE.

JAMES H. BAKER, GEORGE F. SHEVLIN, AND FREDERICK H. BAKER, OF SARATOGA SPRINGS, NEW YORK.

ECCENTRIC.

SPECIFICATION forming part of Letters Patent No. 543,667, dated July 30, 1895.

Application filed April 24, 1895. Serial No. 546,989. (No model.)

*To all whom it may concern:*

Be it known that we, JAMES H. BAKER, GEORGE F. SHEVLIN, and FREDERICK H. BAKER, citizens of the United States, residing at Saratoga Springs, in the county of Saratoga and State of New York, have invented an Improvement in Eccentrics, of which the following is a specification.

Compound eccentrics have heretofore been made use of in which there is an eccentric made with or fastened to a shaft, and around this an eccentric-ring has been provided that acts upon the eccentric-strap or other device to be moved, and the eccentric-ring has been movable in relation to the eccentric so as to vary the throw of the eccentric-rod, but this change in position has had to be made by hand and when the parts were stationary.

It often becomes important, especially in paper machinery, to vary the throw of the eccentric-rod while the machine is running, and the present improvements are made with reference to accomplishing this object.

The fixed eccentric is made with or connected to the rotating shaft, and the eccentric-ring around the same is engaged by a sliding clutch or coupling upon the shaft guided by a key or feather, so that such clutch or coupling rotates with the shaft, and when moved in one direction it uncouples the eccentric, so that it is free to make a partial rotation upon the fixed eccentric and is arrested at the desired point, and when the clutch or coupling is moved in the other direction, the eccentric again is relieved and allowed to make a partial rotation and stop at the first point mentioned. Thereby the throw of the eccentric-rod can be varied, the eccentric-ring being held in one of two positions in its relation to the fixed eccentric of the shaft. Thereby the movement given to the eccentric-rod or other mechanism can be varied without stopping the rotation of the shaft.

Figure 1:
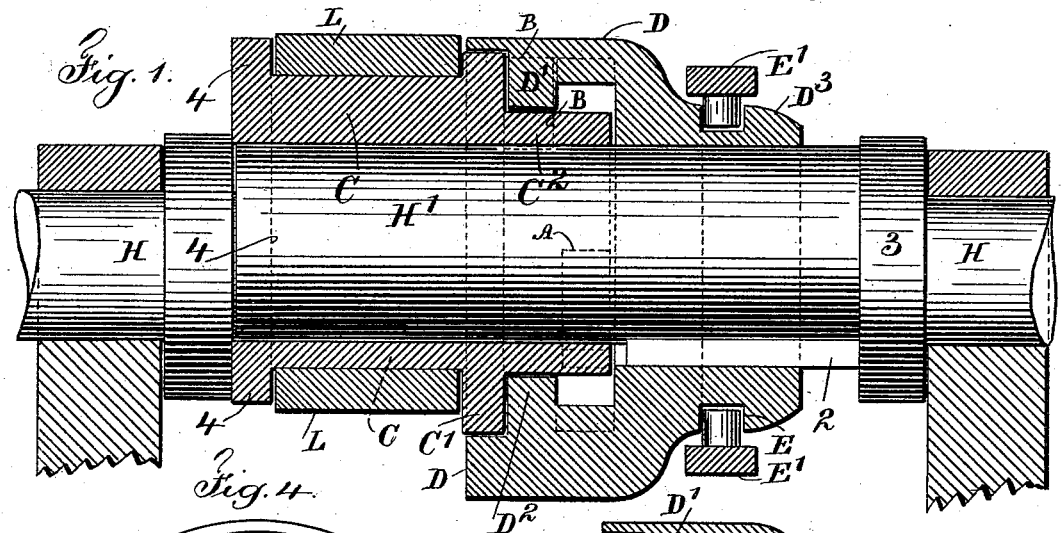
Figure 4:
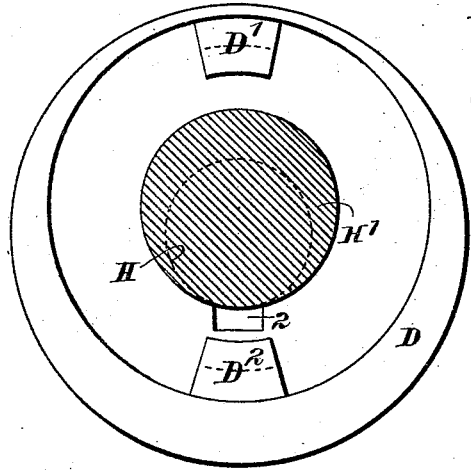
Figure 5:
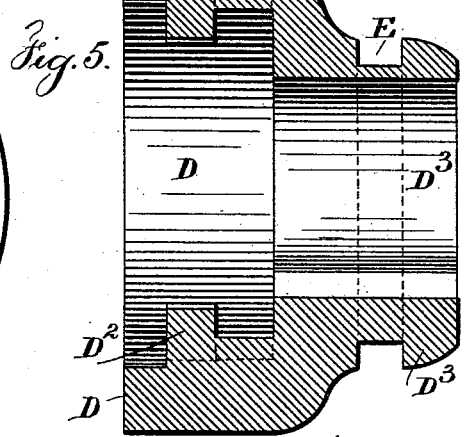
Figure 2:
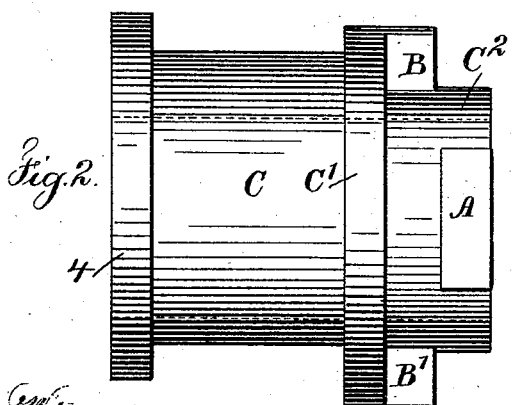
Figure 3:
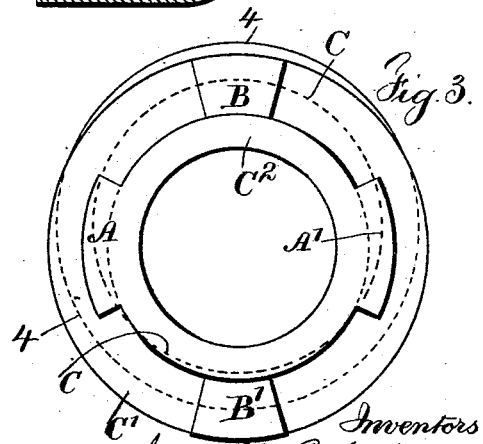

In the drawings, Figure 1 is an elevation of the shaft and eccentric, and a section of the eccentric-sleeve and coupling device. Fig. 2 shows the eccentric-sleeve. Fig. 3 is an end view of the hub of the eccentric-sleeve. Fig. 4 is an end view of the clutch with the eccentric-shaft in section, and Fig. 5 is a section of the same.

The shaft H is made with an eccentric H', usually formed as part of the shaft, and a collar 3 around the shaft H is at one end of the eccentric H', and the eccentric-sleeve C surrounds the eccentric H' and receives the eccentric-rod L or other device to be moved between the collar C' and the collar 4. These parts are to be of any desired size or relative proportions, and the object of the present invention is to allow the eccentric-sleeve C to turn upon the eccentric H' during the movement of the parts, and to hold the eccentric-sleeve in any desired position in relation to the eccentric H' for regulating the extent of movement given by the eccentric-sleeve C to the rod or other article that is acted upon by such eccentric.

There is a hub $C^2$ projecting at one end of the eccentric-sleeve C, and upon it are projecting lugs A A' that are near the outer end of the hub and at opposite sides, and there are also lugs B B' that are upon the hub and intermediate to the lugs A A', and close to the collar C', and the lugs A A' are more distant from the collar C' than the thickness of the lugs B B'. The shell D of the clutch is of a diameter sufficiently large to allow the collar C' and lugs B B' A A' to be received freely within it, but there are inwardly-projecting lugs D' $D^2$ within the shell D, and of a width adapted to engage either the lugs B B' or the lugs A A', and the shell D is provided with a tubular hub $D^3$ sliding upon the shaft H where there is a feather or spline 2 to cause the shell and the hub $D^3$ to rotate with the shaft H, and there is a groove E for the reception of a shifter having a suitable fork E' to enter such groove E, whereby the clutch composed of the shell D, hub $D^3$, and lugs D' $D^2$, can be shifted endwise of the shaft H, and when the clutch is moved so as to stop against the collar 3 the lugs D' $D^2$ engage the lugs A A' upon the hub $C^2$ of the eccentric-sleeve C, and when the clutch is shifted in the other direction the lugs D' $D^2$ are separated from the lugs A A' and engage the lugs B B'.

The relative positions of the lugs A A' and B B' are to be such that when the clutch stands in one position the eccentric-sleeve C will be held in such a relation to the shaft H that the minimum amount of motion will be given to the eccentric-rod, and when the clutch is moved in the other direction the maximum amount of movement will be given to the eccentric-rod.

We have represented the pairs of lugs B B' and A A' at right angles to each other, but the angle may vary according to the difference required in the throw of the eccentric-rod in the different positions, and it will be apparent that when the clutch is moved in one direction to liberate one pair of lugs from the lugs D' D², the eccentric-sleeve C will remain partially quiescent until the clutch, as it is rotated by the shaft H, brings the lugs D' D² into contact with the other pair of lugs upon the eccentric-sleeve, so that the eccentric-sleeve will receive its rotation along with the shaft, and when the clutch is moved in the opposite direction its lugs D' D² will move around until they come in contact with the other pair of lugs on the hub C² to restore the throw of the eccentric-rod to its original movement. In this manner the throw of the eccentric-rod can be varied while the parts are in motion without risk of injury to any of such parts, and we remark that this improvement is especially available for regulating the movement given to the pulp-screens or to the diaphragm in paper-pulp machines, although we do not limit our improvement any particular machine.

In cases where the eccentric H' is made sufficiently long upon the shaft H the clutch may slide upon the eccentric, and in that case the shell of the clutch can be made to fit reasonably close around the collar C', and in this arrangement the hub D³, with its groove H, is eccentric to the shell D and concentric with the shaft H.

We claim as our invention—

1. The combination, with the shaft and the eccentric thereupon, of a loose eccentric or sleeve, a hub at the end having lugs projecting therefrom, a clutch around the shaft, and mechanism for holding the same, and a projection upon the clutch for engaging one of the projections upon the hub of the loose eccentric and giving motion to such eccentric and for varying the throw of the eccentric rod according to the projections that are engaged, substantially as set forth.

2. The combination, with a shaft having upon it an eccentric, of a surrounding loose eccentric or sleeve, a hub upon the same having lugs projecting therefrom in pairs, one pair of lugs being at an angle to the other pair of lugs, a clutch and feather on the shaft, and means for sliding such clutch, a shell and projections for engaging one pair of lugs or the other pair of lugs upon the hub of the eccentric sleeve, substantially as set forth.

Signed by us this 16th day of April, 1895.

JAMES H. BAKER.
GEORGE F. SHEVLIN.
FREDERICK H. BAKER.

Witnesses:
AMOS S. BROWNE,
CORLISS SHELDON.